(No Model.)
F. LANSBERG.
GOVERNOR VALVE FOR AIR BRAKES.
No. 436,713. Patented Sept. 16, 1890.
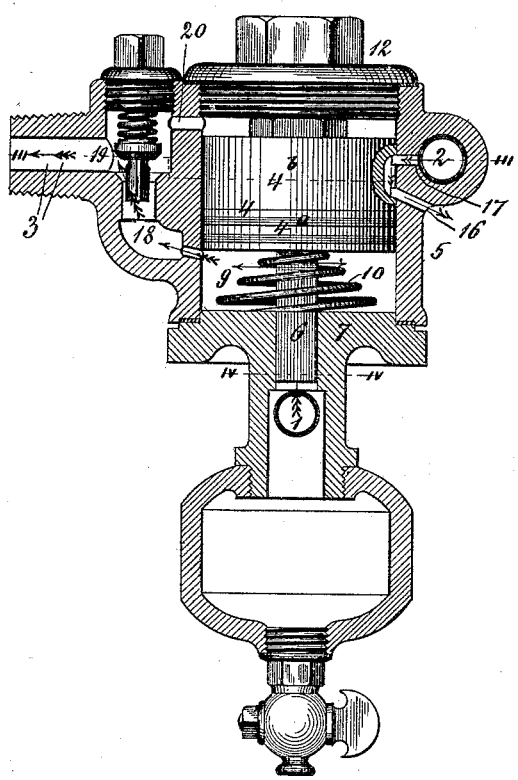
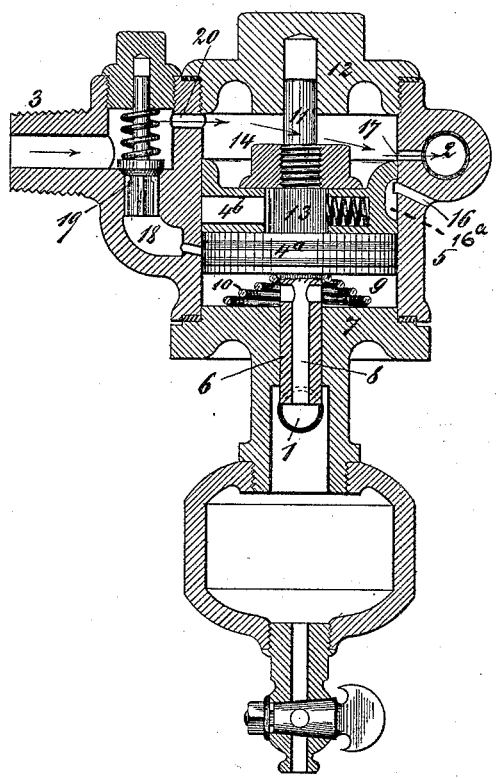
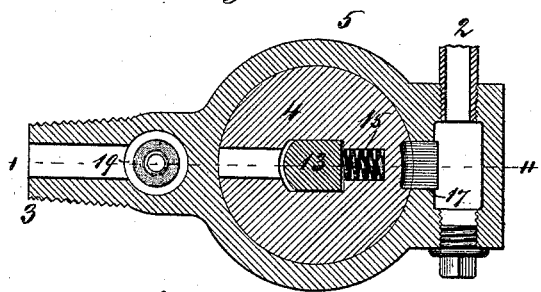
Attest:
E. Arthur
W. E. Knight
Inventor:
Frank Lansberg
By Knight Bros
Attys
THE NORRIS PETERS CO., PHOTO-LITHO., WASHINGTON, D. C.

UNITED STATES PATENT OFFICE.

FRANK LANSBERG, OF ST. LOUIS, MISSOURI, ASSIGNOR TO THE LANSBERG BRAKE COMPANY, OF SAME PLACE.

GOVERNOR-VALVE FOR AIR-BRAKES.

SPECIFICATION forming part of Letters Patent No. 436,713, dated September 16, 1890.

Application filed September 2, 1889. Serial No. 322,799. (No model.)

*To all whom it may concern:*

Be it known that I, FRANK LANSBERG, of the city of St. Louis, in the State of Missouri, have invented a certain new and useful Improvement in Governor-Valves for Air-Brakes, of which the following is a full, clear, and except description, reference being had to the accompanying drawings, forming part of this specification.

My invention relates to an improved valve for air-brakes whereby the brakes can be applied with any desired amount of force or pressure; and my invention consists in features of novelty hereinafter fully described, and pointed out in the claims.

Figures I and II are vertical sections through my improved valve, taken on line I II, Fig. III. Fig. III is a transverse section taken on line III III, Fig. I. Fig. IV is a transverse section taken on line IV IV, Fig. I.

Referring to the drawings, 1 represents the train-pipe, 2 the brake-cylinder pipe, and 3 the pipe leading to the reservoir or receiver.

4 represents a piston-valve located in a housing 5 and having a non-circular stem 6, which passes through a head 7 of the housing and is provided with a perforation 8, as shown in Figs. II and IV, and prevents the piston-valve from rotating. As shown in Fig. II, this perforation 8 opens into the chamber 9, in which the valve 4 is located. Between the valve 4 and the head 7 of the housing 5 a spring 10 is located. The tendency of this spring is to lift the valve to its upper position. The valve 4 has an upwardly-extending stem 11 fitting in the head 12 of the housing 5, this head being preferably in the form of a screw-cap, which may be removed to permit access to the parts within the housing.

The valve 4 consists, preferably, of a lower member 4ª, rigidly secured to the stem 6, and a member 4ᵇ, fitting a non-circular portion 13 at the lower end of the stem 11, which latter is simply a continuation of the stem 6 or may be made integrally with the member 4ª. The member 4ᵇ is held down closely to the member 4ª by means of a nut 14, screwed on a threaded portion of the stem 11. The opening in the member 4ᵇ, which receives the portion 13 of the stem 11, is somewhat longer than the width of the stem, as shown in Fig. III, and between this portion of the stem and this member 4ᵇ is placed a spiral spring 15, fitting in a recess formed in the said member. The inner end of this spring bears against the portion 13 of the stem 11 and forces the member 4ᵇ snugly against the wall of the housing 5, which latter has an exhaust-port 16 and a port 17, leading to the brake-pipe 2. As the parts wear, the spring 15 holds the member 4ᵇ outward, compensating for this wear and securing a neat fit between the piston 4 and the housing of the valve.

18 represents a port forming a communication between the chamber 9 beneath the valve 4, when the latter is raised, and the pipe 3. In this port is located a valve 19, which opens in an upward direction.

The ports 16 17, it will be seen, though on the opposite side of the housing, are located intermediate of the ports 18 20, so that the two former will be closed by the piston when said piston is between the ports 18 20, thus avoiding the necessity of an extra valve in connection with the piston for regulating the ports 16 17. The piston is, of course, provided with a cavity 16ª for placing the ports 16 17 in communication while both the ports 18 and 20 are open.

The operation is as follows: The air entering through the train-pipe 1 first lifts the valve 4, and then passes through the port 18, lifting the valve 19, and into the pipe 3 to the receiver. A portion of the air also passes through a port 20 into the chamber 9 above the valve 4. Thus the air-pressure above and beneath the valve is equalized, and the spring 9 holds the valve in the position shown in Fig. 1. Now, when the pressure in the train-pipe 1 is reduced to apply the brakes, the valve 19 instantly closes and the pressure above the valve 4 moves it downwardly just so far as its exertion is in excess of that of the pressure in the train-pipe or beneath the valve 4 added to the strength of the spring 10. This places the opening of the valve 4 entirely within the control of the operator. If he wants to entirely open the port 17, he can easily do so by exhausting the air from the train-pipe, and thus reducing the pressure from beneath the valve 4; but if he only wishes to partially open this port he can do so and hold the valve at this position by reducing the pressure in the train-pipe just sufficiently for this purpose, and thus he regulates the valve by the amount of pressure he maintains in the train-pipe. When he desires to release his brakes, all that is necessary is to turn on the pressure in the train-pipe, which will immediately lift the valve 4, closing the port 17 and opening the exhaust-port 16, as will be plainly understood.

I claim as my invention—

1. In a governor-valve, substantially as described, the combination of the housing having the lower and upper ports 18 20, adapted to communicate with the train and receiver pipes, and the ports 16 17, adapted to communicate with the atmosphere and brake-cylinder, a piston-valve in said housing provided with a separate portion adapted to cover the ports 16 17 when the piston is between the ports 18 20 and having a cavity adapted to place ports 16 17 in communication, a spring behind said separate portion, a check-valve for preventing back-pressure from the receiver into the train-pipe, and a spring for holding said piston normally between the ports 18 20, substantially as and for the purposes set forth.

2. In a governor-valve, substantially as described, the combination of the housing having the lower and upper ports 18 20, adapted to communicate with the train and receiver pipes, and the ports 16 17, arranged intermediate of the aforesaid ports and adapted to communicate with the atmosphere and brake-cylinder, a piston-valve adapted to cover the ports 16 17 when it is between the ports 18 20 and having a cavity for placing the ports 16 17 in communication, a check-valve for preventing back-pressure from the receiver-pipe into the train-pipe, a spring adapted to hold said piston-valve normally between the ports 18 20, and a spring for forcing said piston-valve against the side of the housing, substantially as set forth.

3. In a governor-valve for air-brakes, substantially as described, the combination, with the housing having the requisite ports, of a piston-valve having the member $4^a$, the stem provided with a non-circular portion, the member $4^b$, in which said non-circular portion fits, and a spring bearing between said stem and member $4^b$, substantially as and for the purposes set forth.

4. In a governor-valve made substantially as herein shown and described, the piston 4, consisting of the members $4^a$ $4^b$, the member $4^b$ fitting the stem of the valve and recessed to receive a spring 15, substantially as and for the purpose set forth.

5. In a governor-valve for air-brakes, substantially as described, the combination, with the housing having the requisite ports, of a piston-valve having the member $4^a$, the non-circular stem guided in said housing, the member $4^b$, fitted on said stem, a nut secured on said stem for holding the said members together, and a spring arranged between said stem and member $4^b$, substantially as and for the purposes set forth.

FRANK LANSBERG.

In presence of—
E. S. KNIGHT,
THOMAS KNIGHT.